(12) United States Patent
Mulder

(10) Patent No.: US 10,309,020 B2
(45) Date of Patent: Jun. 4, 2019

(54) ELECTROLYTIC CELL FOR THE PRODUCTION OF AMMONIA

(71) Applicant: Technische Universiteit Delft, Delft (NL)

(72) Inventor: Fokko Marten Mulder, Delft (NL)

(73) Assignee: TECHNISCHE UNIVERSITEIT DELFT, Delft (NL)

(\*) Notice: Subject to any disclaimer, the term of this patent is extended or adjusted under 35 U.S.C. 154(b) by 687 days.

(21) Appl. No.: 14/905,510

(22) PCT Filed: Jul. 18, 2014

(86) PCT No.: PCT/NL2014/050492
§ 371 (c)(1),
(2) Date: Jan. 15, 2016

(87) PCT Pub. No.: WO2015/009155
PCT Pub. Date: Jan. 22, 2015

(65) Prior Publication Data
US 2016/0194767 A1 Jul. 7, 2016

(30) Foreign Application Priority Data
Jul. 18, 2013 (NL) ..................................... 2011188

(51) Int. Cl.
*C25B 9/06* (2006.01)
*C25B 11/04* (2006.01)
(Continued)

(52) U.S. Cl.
CPC ................. *C25B 9/06* (2013.01); *C25B 1/00* (2013.01); *C25B 9/08* (2013.01); *C25B 11/035* (2013.01);
(Continued)

(58) Field of Classification Search
CPC ......... C25B 9/06; C25B 11/035; C25B 11/04; C25B 9/08; C25B 1/00; H01M 8/222; Y02P 70/56
See application file for complete search history.

(56) References Cited

U.S. PATENT DOCUMENTS 4,097,346 A 6/1978 Robertson
7,811,442 B2 10/2010 Holbrook et al.
(Continued)

FOREIGN PATENT DOCUMENTS

EP 0 972 855 A1 1/2000

OTHER PUBLICATIONS

Amar et al., "Solid-state electrochemical synthesis of ammonia: a review", Journal of Solid State Electrochemistry, 2011, vol. 15, pp. 1845-1860.
(Continued)

*Primary Examiner* — Arun S Phasge
(74) *Attorney, Agent, or Firm* — Sunit Talapatra; Foley & Lardner LLP

(57) ABSTRACT

The invention provides an electrolytic cell 10 for the production of ammonia ($NH_3$), comprising an electrolytic cell unit 100 comprising a first electrode 110, a second electrode 120, and an electrolyte 133, further a voltage generator 210, a supply 220 of a dinitrogen comprising fluid 221, and a supply 230 of a water comprising fluid 231. The electrolyte is configured to allow transport of protons. The first electrode is permeable for protons, wherein the first electrode is at first side in contact with the electrolyte and at second side is in fluid contact with the supply of the dinitrogen comprising fluid. The second electrode is permeable for protons but impermeable to $O_2$ and $H_2O$. The second electrode is at first side also in contact with the electrolyte, and at second side in fluid contact with the supply of the water comprising
(Continued)

fluid. The ammonia can be produced and stored in liquid form.

21 Claims, 4 Drawing Sheets

(51) Int. Cl.
    *C25B 1/00*     (2006.01)
    *C25B 9/08*     (2006.01)
    *C25B 11/03*     (2006.01)
    *H01M 8/22*     (2006.01)

(52) U.S. Cl.
    CPC .............. *C25B 11/04* (2013.01); *H01M 8/222* (2013.01); *Y02P 70/56* (2015.11)

(56) References Cited

U.S. PATENT DOCUMENTS

| | | |
|---|---|---|
| 2002/0100681 A1 | 8/2002 | Kirk et al. |
| 2003/0164305 A1 | 9/2003 | Denvir et al. |
| 2006/0049063 A1* | 3/2006 | Murphy .................. C25B 1/00 205/552 |
| 2008/0149493 A1 | 6/2008 | Friesen et al. |
| 2009/0095636 A1* | 4/2009 | Botte ...................... C25B 1/00 205/552 |
| 2010/0055509 A1 | 3/2010 | Angell et al. |
| 2012/0241328 A1 | 9/2012 | Joshi et al. |

OTHER PUBLICATIONS

Ertl, "Reach at surfaces: From atoms to complexity (Nobel Lecture)", Angewandte Chemie, 2008, vol. 47, pp. 3224-3235.

Giddey et al., "Review of electrochemical ammonia production technologies and materials" International Journal of Hydrogen Energy, 2013, vol. 38, pp. 14576-14594.

Mondal et al., "Highly stable aprotic ionic-liquid doped anhydrous proton-conducting polymer electrolyte membrane for high-temperature applications", Journal of Materials Chemistry, 2011, vol. 21, pp. 4117-4124.

Nenoff et al. "Membranes for hydrogen purification: An important step toward a hydrogen-based economy", MRS Bulletin, 2006, vol. 31, pp. 735-744.

Ockwig et al., "Membranes for hydrogen separation", Chemical Reviews, 2007, vol. 107, pp. 4078-4110.

Ouzounidou et al., "Catalytic and electrocatalytic synthesis of NH3 in a H conducting cell by using an industrial Fe catalyst" Solid State Ionics, 2007, vol. 178, pp. 153-159.

Pappenfus et al., "Wind to Ammonia: Electrochemical processes in room temperature ionic liquids", ESC Transactions, Electrochemical Society, 2009, vol. 16, pp. 89-93.

Skodra et al., "Electocatalytic synthesis of ammonia from steam and nitrogen at atmospheric pressure" Solid State Ionics, 2009, vol. 180, pp. 1332-1336.

Skulason et al., "A theoretical evaluation of possible transition metal electro-catalysts for N2 reduction," Physical Chemistry Chemical Physics, 2012, vol. 14, pp. 1235-1245.

Stern, "The 'Barrer' Permeability Unit", Journal of Polymer Science: Part A-2, 1968, vol. 6, pp. 1933-1934.

Tkacz, "Enthalpies of formation and decomposition of nickel hydride and nickel deuteride derived from (p,c,T) relationships", Journal of Chemical Thermodynamics, 2001, vol. 33, pp. 891-897.

International Search Report and Written Opinion of the International Searching Authority issued in International Patent Application No. PCT/NL2014/050492 dated Sep. 1, 2015.

* cited by examiner

ELECTROLYTIC CELL FOR THE PRODUCTION OF AMMONIA

CROSS-REFERENCE TO RELATED APPLICATIONS

This application is the National Phase of International Patent Application No. PCT/NL2014/050492, filed Jul. 18, 2014, published on Jan. 22, 2015 as WO 2015/009155 A1, which claims priority to Netherlands Patent Application No. 2011188, filed Jul. 18, 2013. The contents of these applications are herein incorporated by reference in their entirety.

FIELD OF THE INVENTION

The invention relates to an electrolytic cell for the production of ammonia ($NH_3$). The invention further relates to an electrolytic cell unit for use in such cell. The invention also relates to a system that includes such cell. The invention further relates to a process for the production of ammonia.

BACKGROUND OF THE INVENTION

The use of electrolytic cells to generate ammonia is known in the art. US2012241328, for instance, describes that ammonia is synthesized using electrochemical and non-electrochemical reactions. The electrochemical reactions occur in an electrolytic cell having a lithium ion conductive membrane that divides the electrochemical cell into an anolyte compartment and a catholyte compartment. The catholyte compartment includes a porous cathode closely associated with the lithium ion conductive membrane. The overall electrochemical reaction is: $6LiOH+N_2 \Rightarrow 2Li_3N(s)+3H_2O+3/2O_2$. The nitrogen may be produced by a nitrogen generator. The non-electrochemical reaction involves reacting lithium nitride with water and/or steam as follows: $Li_3N(s)+3H_2O \Rightarrow 3LiOH+NH_3(g)$. The ammonia is vented and collected. The lithium hydroxide is preferably recycled and introduced into the anolyte compartment. The electrolytic cell is shut down prior to reacting the lithium nitride with water. The cathode is preferably dried prior to start up of the electrolytic cell and electrolyzing $Li^+$ and $N_2$ at the cathode.

US2008/0149493 describes apparatuses and methods for producing ammonia. One embodiment uses a plurality of environments and an electrode configured to be exposed to the plurality of environments. The electrode is configured to receive hydrogen while being exposed to one of the environments, reduce nitrogen while being exposed to another environment, and allow the hydrogen and nitrogen to react with each other to form ammonia. Other embodiments provide for simultaneous hydrogen oxidation and nitrogen reduction at the same electrode, which in turn react for formation of ammonia.

SUMMARY OF THE INVENTION

Prior art systems for the generation of ammonia may often suffer from inefficiency, the necessity to operate batch wise instead of continuously, the necessity to have low ammonia yield, and/or the necessity to use elevated temperatures, such as at least 500° C. Further, often noble metals are used for the electrodes which lead to high costs.

Hence, it is an aspect of the invention to provide an alternative electrolytic cell for the production of ammonia, which preferably further at least partly obviates one or more of above-described drawbacks. It is also an aspect of the invention to provide a system or infrastructures comprising such electrolytic cell, which preferably further at least partly obviate one or more of above-described drawbacks. It is yet further an aspect of the invention to provide an alternative process for the production of ammonia, which preferably further at least partly obviates one or more of above-described drawbacks.

Especially, the aim of this invention is to provide the direct electrolytic ammonia synthesis from water and nitrogen with an electrolysis system design based on abundant elements. Ammonia production using the high temperature and pressure Haber-Bosch process is well known for producing agricultural fertilizers and feedstocks for chemical industries. Of further importance is that ammonia contains only abundant elements, and it reaches liquid form at close to ambient conditions (20° C., 10 Bar) with a high volumetric and gravimetric energy density. As such it is suitable for large scale renewable energy storage at the level of 1000 TWh or more. Ammonia is a poisonous substance which calls for strict safety measures and application in an industrial environment. However, a century of experience is available and current ammonia storage terminals for agricultural fertilizers are reaching the 60000 ton scale in a single unit (~373 GWh HHV).

This invention provides the renewable $CO_2$ free production of ammonia ($NH_3$), for instance for use as energy carrier. Ammonia is mentioned as acceptable fuel. The proposed method does not emit $CO_2$ for the electrolytic production phase since no C containing matter is being consumed. Further, renewable electricity may be used from e.g. solar cells of wind turbines. Only in the mining for e.g. metals used during synthesis there will likely be use of fuel, but in an industrial mining environment this could potentially be based on $NH_3$ as fuel. The main environmental issue with $NH_3$ may be its poisonous nature. For that reason we propose this as a fuel in a closed, industrial, environment for the largest scale of renewable energy storage (strategic oil reserve scale, enabling seasonal energy storage). This could be produced near and used in central grid connected small or large power plants. Safety measures are similar to those of the standard liquid containers as used in fertilizer industry (100 years experience). Water to take up the ammonia in case of spills may be an additional safety measure (note that concentrated ammonia solutions are sold at retailers as cleaning agent, without problems). Of further interest is that $NH_3$ is biodegradable, since it is a main agricultural fertilizer. $NO_x$ greenhouse gas production during combustion is no larger problem than in normal combustion; in fact a small surplus of $NH_3$ is used in large engines (ships) to suppress the formation of $NO_x$. $NH_3$ is also intensively used in various heat engines as environmentally benign working medium, and as such 100 years of experience is available.

$NH_3$ can and has been used as a fuel in modified combustion engines, gas turbines, rocket engines, and fuel cells. The energy content is 22.5MJ/kg (HHV).

Here, electrolytic ammonia synthesis from $H_2O$ and $N_2$ directly to $NH_3$ and $O_2$ is provided. The electrolysis efficiency will especially depend on overpotentials and ionic and electronic resistances that are determined by respectively catalytic and kinetic parameters. The lowest potential required to electrolytically synthesize ammonia from water and nitrogen depends on the Gibbs free energy change and is around 1.18V at RT and ambient pressure for liquid water plus gaseous nitrogen electrolysis to produce gaseous ammonia and oxygen. The overpotentials that need to be applied depend on the desired ammonia production rate, the electrolysis conditions (temperature and pressure, the state of water and ammonia (liquid or gas)), internal resistances for ion and electron transport, and the catalytic activity of the electrode surfaces. They may range in practice between 0.05V and 1V, but for efficiency reasons may be limited to 0.3 to 0.7V. The efficiency is addressed below and is potentially similar as electrolysis of water to produce hydrogen (i.e. $H_2$) alone. For making ammonia this is a significantly larger overall efficiency than first electrolyze water to produce $H_2$ and subsequently perform the Haber process to produce ammonia. The large advantage of $NH_3$ compared to $H_2$ is that $NH_3$ can be produced and stored in liquid form at e.g. 10 Bar and 20° C. (i.e. moderate conditions) at a scale that now only fossil fuels reach. Hence, especially (during the process) the ammonia at the first electrode is maintained at a partial pressure of at least 10 bar and at a temperature between 20 and 85° C.

Current ammonia production from fossil fuels costs 1% of the total world energy use, mainly for the production of agricultural fertilizers. Electrolysis in this method will require low cost abundant materials and catalysts. $N_2$ is abundant in air (78%), electrodes and catalysts in the invention may contain one or more of Ni, Fe, K, Li, and alternatively or additionally also one or more of O, S, H which are sufficiently abundant at low cost. This will enable the large scale implementation not only for energy storage but also for 'feeding the world $CO_2$ neutral'.

Electrolysis at close to ambient conditions is relatively easy to switch on and off. This is unlike electrolysis at high temperatures or the conventional high T-high P Haber process. These latter processes require the T and P to remain rather constant and high but the heat management directly relies on the operating power. Since renewable electricity production from solar and wind power varies significantly during the day and night this is one of the reasons why we aim at electrolytic ammonia production at close to ambient conditions.

Clearly, also water would be required, as well as nitrogen. Nitrogen separation from air is performed routinely, at the cost of some <6% of the LHV of $NH_3$ made from it. Water purification will also come at a cost; however, since—in an embodiment—at large scale central ammonia production and use power plants would be envisaged, the relatively pure water resulting after using the stored ammonia could be separated from exhaust $N_2$/gas by water condensation and could be stored for new ammonia production.

The methods for production of ammonia historically use the Haber process in which $N_2$ and $H_2$ are bound according to the reaction $N_2+3H_2 \Rightarrow 2NH_3$ with $\Delta H=-46$ kJ/mol $NH_3$. Although it is mildly exothermic, this reaction takes place at elevated temperature and pressure (200-300 bar, 300-550° C.) using Fe or Ni based catalysts. Under these conditions typical $NH_3$ yields appear to be 15%, which calls for separation, recycling and purification of reactants. The operating conditions and separations make the Haber process energy intensive. In addition hydrogen needs to be produced independently using e.g. electrolysis. In literature, an overall efficiency of 40% is reported for converting electricity in ammonia fuel when counting the HHV of product $NH_3$ (this becomes 33% when the LHV is used). In the Haber-Bosch process the production of hydrogen from fossil fuels is integrated in the process. Usually methane is converted to yield $H_2$ and heat for the further reaction with $N_2$. In such process fossil fuel is required and $CO_2$ emission results.

Here, a novel approach is provided for electrolytic ammonia production from $H_2O$ and $N_2$ following the overall reaction:

$$3H_2O+N_2 \Rightarrow 2NH_3+3/2O_2$$

This overall reaction can be realized by the following half reactions, also indicated in FIG. 1: The half reaction at the positive electrode is:

$$2H_2O \Rightarrow 4H^++4e^-+O_2$$

and at the negative electrode:

$$6H^++6e^-+N_2 \Rightarrow 2NH_3$$

Both half reactions are multiple electron reactions. In general, multiple electron reactions require suitable catalytic electrode surfaces and electrical overpotentials in order to proceed at sufficient rate, and to cross barriers between (intermediate) reaction steps.

Hence, at a first electrode, for instance one comprising a $N_2$ binding Fe catalyst, the reaction $N_2+6H^++6e^- \Rightarrow 2NH_3$ may occur, and at a second electrode, for instance one comprising an $O_2$ evolution catalyst, the reaction $2H_2O \Rightarrow O_2+4H^++4e^-$ may occur.

In the art, several methods for production of ammonia are discussed. Also electrolytic composition of ammonia is discussed, but then using high temperature solid oxygen or proton conducting electrolytes. Also molten salts have been used as electrolytes at elevated temperatures. It may be remarkable that one uses the high temperature electrolytic synthesis because in principle ammonia can decompose at high temperature, which is clearly not desirable.

Ambient conditions seem also to be possible by using a modified Pt catalyzed polymer electrolyte membrane electrolyser, where the polymer membrane consists of Nafion 211 ("Nafion"). The Nafion can be first reacted with ammonia to replace $H_3O^+$ by $NH_4^+$. Successful synthesis of $NH_3$ from $N_2$ and $H_2$ seem possible albeit at low production rate. The synthesis of ammonia from $H_2O$ and air at ambient pressure seem also be possible, but only at a low current efficiency.

Many metals can transport hydrogen from one side of the solid, closed foil produced from the metal to the other side. For hydrogen as a gas the $H_2$ molecule adsorbs on the surface, dissociates into atoms at the metal surface, then the H atoms enter the metal as interstitial H atoms, diffuse to the other side of the metal, reassemble in $H_2$ on the other side of the metal surface, and desorb as hydrogen gas. The interstitial H atoms consist of a proton and an electron, where in a metallic hydride the electron can be (partly) delocalized in the metal. Similarly hydrogen can be inserted from a hydrogen containing electrolyte into the metal, as a proton where the electron comes from the external circuit, or from the oxygen ion in water. Here we consider the transport of hydrogen through permeable membranes, where the hydrogen consists of a proton and a (partly) delocalized electron.

In a recent experiment on the proton transport capabilities of a nickel membrane we found the result that a hydrogen current corresponding to a proton current of 100 mA/cm² through the membrane is possible without modification. This experiment was performed by inserting a solid Ni membrane in front of the anode of a nickel metal hydride battery. The charging and discharging of the test battery involves the transport of protons between the $Ni(OH)_2$ cathode and the $LaNi_5$ type anode through an alkaline electrolyte while the electrons follow through the external circuit. During charge the following half reactions take place:

$$Ni(OH)_2 \Rightarrow NiO(OH)+H^++e^- \text{ at the cathode}$$

and $$LaNi_5+xH^++xe^- \Rightarrow LaNi_5H_x \text{ with } 0<x<\sim 6$$

Protons thus have to be transported through the Ni membrane (and electrons through the external circuit). Since a proton current of 100 mA/cm² appeared possible under normal battery operation both ways this indicates the adequate transport properties. Metals like Ni and Fe have high rate H permeation in a gas environment and also electrochemical permeation experiments with such metals is known. However, we find a much higher proton current than reported (described in more detail in the paragraph below), possibly because we apply different experimental conditions with gradients in chemical potential for the transported hydrogen. The large currents found, with only small over potentials applied makes the Ni membrane interesting for application as gas tight, proton transparent and electron conducting electrode in electrolysis.

The proton transport through a nickel membrane as is used in the embodiment for the ammonia electrolyser was tested independently as follows. For Ni foils with a thickness between 0.5 micron to 150 micron high proton currents between 0.1 mA/cm² and 1000 mA/cm² can be applied. Specifically, in one embodiment a Ni foil with thickness between 10 micron and 100 micron, more specifically between 20 and 50 micron, an experimental proton current perpendicular through the membrane could be applied between 0 mA/cm² and 200 mA/cm², such as in an electrochemical cell with a commercial Ni(OH)₂ based electrode (cathode) as proton source, The proton flow through the Ni foil can be witnessed from the subsequent reversible discharge. This also indicates that the Ni foil transports H in both directions. Also other electrodes, e.g. in the form of foils, may have such thicknesses.

Of further relevance is that Ni is stabilized on its surface in alkaline environment, which is important for ammonia synthesis within the present concept.

In view of the result using Ni membranes, it is suggested to apply e.g. closed Ni membranes as positive and negative electrode where the electrolytic cell can then be designed as indicated in FIG. 1, i.e. especially with gas/liquid tight electrodes. This is very different from the normal approach where Pt catalysts in gas diffusion electrodes are coupled to e.g. a Nafion based electrolyte or where a high temperature solid electrolyte with gas diffusion electrodes is used. In such conventional cell designs it is always the 'triple phase boundary' where water molecules can approach the catalyst, as well as electronic and ionic conducting phases, which is a critical factor in the design and operation characteristics. With e.g. solid Ni at the positive electrode an electronic and ionic conductor is obtained in one which can be interfaced with the liquid water in alkaline solution on one side and the electrolyte on the other. At the negative electrode there is access of $N_2$. The full Ni surface can then be active and not the much more limited triple phase boundary area.

At the positive electrode the splitting of water in $O_2$, $2H^+$ and $2e^-$ takes place via several intermediate steps. Not being bound to theory, these intermediate steps may include:

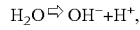

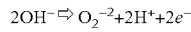

and

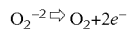

The $H^+$ and $e^-$ are inserted in the Ni electrode. Hydrogen has been inserted electrochemically in Ni up to $NiH_{0.7}$; otherwise nickel hydride is very unstable at room temperature ($\Delta H$ is as high as $-5$ kJ/mol $H_2$) (M. Tcakz, J. Chem. Thermodynamics 2001, 33, 891).

Higher rates for H insertion in the Ni electrode will occur when the $OH^-$ intermediate is better bound at the surface, reducing the barrier for intermediate formation. For Ni in alkaline solution NiO(OH) and Ni(OH)₂ are commonly present at the surface, and they show high proton (and electron) mobility as witnessed in the NiMH battery context. In recent publications Ni(OH)₂ and other transition metal hydroxides were also indicated as a promoter of electro catalytic activity for oxygen evolution reactions. Different 3d transition metal hydroxide surfaces in the oxygen and hydrogen evolution reactions for water electrolysis are known in the art. From a practical perspective the water splitting reaction occurs readily in alkaline environment. It used to be and still is one of the major concerns in the Ni-MH battery during over-charge: when the battery is charged completely (one H removed from Ni(OH)₂, forming NiO(OH)), further charge makes that O₂ evolution occurs, destructing the alkaline electrolyte. The potential required for the Oxygen Evolution Reaction (OER) in the NiMH battery is below 1.5V, compared to a 1.3-1.35 V equilibrium potential (chargers are therefore limited to ~1.45V). The calculation of the minimum potential for a $H_2O(l)+N_2$ electrolysis reaction to form $O_2+NH_3$ equals 1.18V at 300K. Also the enthalpy of formation of $MNi_5H_x$ and $NH_3$ both happen to be of the order $-15$ kJ/mol H atoms. Thus approximately the same over potentials for oxygen evolution in the ammonia electrolysis case can be expected as in the battery case since a similar NiO(OH) based surface is present. A realistic over potential thus can be about 0.2V (1.5-1.3V) for the OER. For the battery the problem of $O_2$ evolution has been partly solved by enabling the $O_2$ (neutral) to diffuse to the metal hydride anode where it reacts with the hydride to form $OH^-$ and $H_2O$, renewing the battery electrolyte. In addition various attempts are made to increase the over potential for the OER, including Co (cobalt) modification to name just one. In our electrolysis case we desire $O_2$ evolution at low overpotential, which may indicate that the NiO(OH) catalyzed electrode is a good embodiment. We also need to stop this $O_2$ diffusion towards the ammonia production side at the other electrode by having an easy way out for $O_2$ and a closed electrode with $O_2$ release as indicated in FIG. 1.

In our alkaline Ni based electrolysis cell we thus propose the Ni(OH)₂—NiO(OH)-on-Ni electrode material and a water based solution at the positive electrode. In alkaline environment such Ni(OH)₂—NiO(OH) is stable, as in a NiMH battery, and $O_2$ evolution and proton generation from splitting the water will readily proceed. At high current strength the overpotential for the OER increases, depending on charge transfer, diffusion parameters. The second electrode, or the positive electrode, may thus comprise nickel. Optionally, deliberately a Ni(OH)₂ layer may be formed on (the second side of) such second (positive) electrode. However, such layer may also be formed during the electrolysis process, as the second side of the second electrode may be in contact with the (highly) alkaline fluid. Hence, in a relative simple way an oxygen evolution catalyst may be formed. However, other electrodes than Ni (second) electrodes may also be applied (such as one or more of Ni, Fe, Mn, Mo, W, Cu, V, Ti, Ta, Nb, Zr, Hf, Pt and Pd, or an alloy of two or more of these such as $Ni_{1-x}Ti_x$ or Ni—Nb—Ti; see also below).

Of further interest is that Ni porous metal mesh is also applied as current collector in alkaline NiMH batteries and alkaline hydrogen electrolysers, which indicates the chemical stability and corrosion resistance in alkaline environment (KOH solution, electrolyte, ammonia).

At the negative electrode the reaction $6H^+ + 6e^- + N_2 \Rightarrow 2NH_3$, with $\Delta H = -92$ kJ/mol $N_2$, should take place. Note that this is a mildly exothermic reaction.

The barriers to form $NH_3$ are the chemisorption of $N_2$, and its activation and binding with H into $NH_3$, via intermediates, including the possibility of $H_2$ production as a side reaction. The presence of a high proton and electron flux within the Ni metal electrode is realized as indicated in the battery plus Ni membrane above. The adsorption of $N_2$ and intermediates on metal based catalysts in order to react with $H_2$ has been studied experimentally since a century. Essentially $N_2$ chemisorbs only at low T on Ni, but no knowledge is available for negatively polarized and proton inserted Ni.

Suitable $NH_3$ formation electro-catalysts are to be selected from different materials including those from the conventional Haber process. Notably a K or Li, Mg, modified iron catalyst is used most often in the high T high P Haber process for ammonia synthesis. Such suitable iron based catalyst will be coated on the Ni membrane. For closed layers of catalyst on the Ni membrane the hydrogen (proton and electron) transport should be high, in that respect it is noted that similar hydrogen permeation rates are known for H through Fe.

The work of G. Ertl indicated the adsorption and chemisorption of $N_2$ on an iron surface as well as important intermediate steps towards ammonia synthesis in the Haber process as indicated in FIG. 2. The adsorbed $N_2$ is chemisorbed as individual atoms on iron [100] that are located in the open space in between the iron atoms (see also FIGS. 3*a*-3*b*). Hydrogen atoms bind to the nitrogen atoms, in a successive way, where then the NH, $NH_2$ and $NH_3$ is formed, the latter having the lowest adsorption interaction. The $NH_3$ can thus be replaced by fresh N that is more tightly chemisorbed.

In our approach the hydrogen comes from the solid interior of Ni with e.g. a Fe catalyst on top towards the surface where the N is adsorbed. Arrived at that position it should bind to N, NH or $NH_2$ rather than to another H. This is a selectivity question that will depend on the local catalyst surface, kinetic parameters, the relative densities of the reactants, as well as thermodynamic factors. N may reach a high density at the Fe surface at atmospheric $N_2$ pressures, and the formation of $NH_3$ from $N_2$ and $H_2$ is an exothermic reaction. These factors favor the formation of $NH_3$ over $H_2$. Furthermore to suppress $2H^+ + 2e^- \Rightarrow H_2$ or $H_{ad} + H_{ad} \rightarrow H_2$ one can apply an initial $H_2$ pressure at the ammonia side of the membrane, selectively suppressing $H_2$ formation.

The iron catalyst may form nitrides with limited stability. This low stability of the iron nitrides will be of advantage since the nitrogen should react further from the N adsorbed state to form NH bonds and $NH_3$, and not a too stable iron nitride. Iron nitride formation where nitrogen enters the bulk needs high temperature processing. This is not applied here, which makes that the N is expected only at the surface. The promoter K, Li and Mg ions are reported to enhance the adsorption of N on the Fe surface. The current understanding of the function of K on the iron catalyst is that the highly electropositive K donates local electric charge to the surrounding iron surface, which aids in bonding the $N_2$ on the Fe surface. In our invention we also apply electrically a negative charge on the electrode and its surface which may thus influence the interaction with nitrogen. Although the Fe based catalyst has been used for many decades it has not been used as electro catalyst in this way.

For pure Ni it is known that nitrides can be formed, and they are just like iron nitride also not very stable. Experimentally high temperature and pressure are used to form Ni nitrides. Ni as negatively charged electrode with interstitial H as present in the current cell design may thus already have relevant adsorption/chemisorption characteristics for $N_2$. For this reason also the Ni electrode surface itself may be considered suitable for $NH_3$ synthesis, at various overpotentials.

In summary an electro catalyst needs to be used that has available active sites that bind sufficiently but not too strongly to the intermediates involved (this is similar to the often indicated 'vulcano plot' for catalyst activity related to interaction strength between catalyst and (intermediate) products). Iron and nickel based electrocatalysts with promoter elements such as K can provide such catalytic activity.

In FIG. 4 an indication is given of the thermodynamic efficiency of converting $H_2O$ and $N_2$ in $NH_3$ and $O_2$ by electrolysis. Also indicated is the potential efficiency taking into account necessary over potentials. The result is efficiencies that compare with values found for electrolytic $H_2$ production, but here directly ammonia is produced which can easily be stored in liquid form. Working at 10 Bar partial $NH_3$ pressure and room temperature will generate liquid $NH_3$ which means that then the condensation heat of $NH_3$ is spared during synthesis, while the $N_2$ solubility in liquid $NH_3$ leads to similar volumetric $N_2$ density as in the gas phase. Hence, in an embodiment the pressure at the ammonia formation side of the electrolysis cell is at least 8 bar $NH_3$ pressure, even more especially at least 10 bar (see also below). Especially, the process may further comprise maintaining an ammonia (partial) pressure above the vapor pressure of ammonia, i.e. especially high enough to directly liquefy the ammonia at the operation temperature used.

In a specific embodiment, the first electrode is at the first side in contact with the electrolyte and at the second side is in fluid contact with the supply of the dinitrogen comprising fluid, wherein the second electrode is at the first side also in contact with the electrolyte, and at the second side in fluid contact with the supply of the water comprising fluid, and wherein a first fluid pressure at the second side of the first electrode and a second fluid pressure at the second side of the second electrode are substantially equal. Hence, the process may further include maintaining the first and the second fluid pressure substantially equal, such as between fluid pressure ratios in the range of 0.8 and 1.25, especially in the range of 0.9 and 1.11. In such embodiment, the process further keeping the fluid containing feed water and the evolving oxygen at a pressure equal to the feed nitrogen (and eventually hydrogen) and evolving ammonia. In this way, pressures may substantially be equal, which may add to the lifetime of the electrolysis cell. Here, total pressures are used (i.e. the total pressure at the second sides, respectively).

The innovation is the use of a direct approach to electrolytic synthesis of $NH_3$ from $H_2O$ and $N_2$ using solid Ni metal based membranes as fast hydrogen conductors and electrodes in one and use of appropriate electro-catalysts. The finding of the rapid hydrogen transport enables the rather different electrolysis cell design. A direct supply of hydrogen atoms (protons plus electrons) to the surface of the negatively charged electrode on which $N_2$ and intermediates have to adsorb readily to form intermediates and $NH_3$ at high rates may be beneficial. In addition the yield of $NH_3$ can be enhanced since the close to ambient operation temperature favors the synthesis of $NH_3$ over its decomposition product $N_2$ and $H_2$ (unlike the current Haber process or the high T electrolysis).

Ammonia is a high energy density fuel with energy density comparable to half of that of gasoline. It is based on abundant elements only and could be produced using renewable electricity with good efficiency. Since upon increasing renewable energy implementation more electricity is going to be produced in the daytime peak than can be used as electricity the surplus should be converted in usable energy for use at a later time or season. Note that in 2012 already a peak of 22GW in solar PV was reached in Germany on a total electricity use of 44GW. In Spain there are days with 75% of the electricity use coming from renewables. This is leading to a reduction of the daytime electricity price, which has direct impact on earning capacities of renewables and fossil fuel based power stations during daytime.

Ammonia production in a renewable way fits well in the activities of the agricultural fertilizer producers. Methane is (also) used for the production of $NH_3$ based fertilizers. In a renewable future we still need to 'feed the world' using these fertilizers. Renewable $NH_3$ from $H_2O$, $N_2$, abundant catalysts and renewable electricity is a novel advantageous approach.

Hence, in a first aspect the invention provides an electrolytic cell (herein also indicated as "cell" or "electrolysis cell"), especially for the production of ammonia ($NH_3$), the electrolytic cell comprising (i) an electrolytic cell unit (herein also indicated as unit) comprising a first electrode, a second electrode, and an electrolyte, (ii) a voltage generator, (iii) a supply of a dinitrogen comprising fluid, and (iv) a supply of a water comprising fluid, wherein the voltage generator is especially configured to apply a negative potential to the first electrode (cathode) and a positive potential to the second electrode (anode), wherein the electrolyte is configured to allow transport of protons, wherein the first electrode is permeable for hydrogen (protons plus electrons), wherein the first electrode is at first side in contact with the electrolyte and at second side is in fluid contact with the supply of the dinitrogen comprising fluid, and wherein the first electrode comprises one or more of Ni and Fe, and wherein the second electrode is permeable for hydrogen (protons plus electrons), wherein the second electrode is at first side also in contact with the electrolyte, and at second side in fluid contact with the supply of the water comprising fluid.

In yet a further aspect, the invention also provides the electrolytic cell unit per se. Hence, the invention also provides an electrolytic cell unit comprising a first electrode, a second electrode, and an electrolyte, wherein the electrolyte is configured to allow transport of protons, wherein the first electrode is permeable for hydrogen (protons plus electrons), wherein the first electrode is at first side in contact with the electrolyte, and wherein the first electrode especially comprises one or more of Ni and Fe, wherein the second electrode is permeable for hydrogen (protons plus electrons), and wherein the second electrode is at first side also in contact with the electrolyte.

In another aspect, the invention provides a process for the production of ammonia comprising feeding a dinitrogen comprising fluid to the first electrode and a water comprising fluid to second electrode of the electrolytic cell unit as defined herein while especially applying a voltage difference in the range of 1.16 V up to 2.2V. Especially, a process may be used wherein the electrolytic cell as defined herein is applied.

Advantageously, with such cell and with such process, efficiently ammonia is to be produced, with relative cheap electrode materials, and at ambient or not far from ambient (temperature and pressure) conditions. Of course, the invention is not limited to the use of cheap electrode materials and the use of ambient temperature and pressure conditions.

The electrolytic cell comprises an electrolytic cell unit and optionally one or more of the voltage generator, the supply of a dinitrogen comprising fluid, the exhaust for an ammonia comprising fluid; and the supply of a water comprising fluid, and the exhaust for an oxygen comprising fluid. Hence, the cell may further include an inlet for the dinitrogen comprising fluid, an inlet for the water comprising fluid, an exhaust for an ammonia comprising fluid, and an exhaust for an oxygen comprising fluid.

The phrase "in fluid contact with the supply of the water comprising fluid" or the phrase "in fluid contact with the supply of the dinitrogen comprising fluid" and similar phrases especially indicate that during the process such supply may include the indicated fluid. However, when the cell is not in operation, the supply or supplies may be decoupled and/or the supplies do not necessarily contain the indicated respective fluids. The term "fluid contact" may also be indicated as "in fluid communication".

As indicated above, the electrolytic cell unit may comprise the first electrode, the second electrode, and the electrolyte. Especially, both the first and the second electrode comprise a foil of metal or metal alloy. Especially, the first (negative) electrode may comprise Fe or Ni, Ni coated with Fe, or an alloy of one or more these, or Fe doped with elements such as K, Li, Na, Mg, Ca. Alternatively or additionally, the first (negative) electrode may comprise one or more of Mn, Mo, Ru, W, Cu, V, Ti, Ta, Nb, Zr, Hf, and Pd. At the surface also metal oxides may be present. Further, especially the second (positive) electrode may comprise one or more of Ni, Fe, Mn, Mo, Ru, W, Cu, V, Ti, Ta, Nb, Zr, Hf, Pt and Pd, or an alloy of one or more of these. Especially, the second electrode comprises at least one of Ni and Fe, and optionally one or more of Mn, Mo, Ru, W, Cu, V, Ti, Ta, Nb, Zr, Hf, Pt and Pd. The second electrode surface towards the water containing fluid may further be doped with one or more of Mo, W, Co, Na, Li, K, Mg, Ca and contain oxides and sulfides of the metals involved and metal hydroxides or metal oxyhydroxides may be present on the surface, specifically $Ni(OH)_2$ and $NiO(OH)$. The surface area of the electrodes may be enlarged by pores to increase the contact area between electrode and the fluids respectively the electrolyte. The electrodes may comprise membranes, like a Ni membrane or an Fe membrane. The term membrane is used, as both the first and the second electrode are permeable for hydrogen (protons ($H^+$) plus electrons). The first, but specially, the second electrode is substantially non-permeable to $O_2$, $N_2$ and $H_2O$. Optionally, the first (negative) electrode may be permeable to $H_2$. As $H_2$ might be formed at the first electrode, it may be desired to allow the thus formed $H_2$ escape from the electrolytic cell (or electrolytic cell unit), via an outlet (or exhaust), which may in an embodiment be in the form of an $H_2$ permeable first electrode. Hence, the first electrode may in an embodiment be permeable to hydrogen gas. In yet a further embodiment, the process may further comprise feeding a dinitrogen and hydrogen ($H_2$) comprising fluid. In this way, the formation of hydrogen in the electrolytic cell may be suppressed. Hence, in an embodiment deliberately $H_2$ is added to the dinitrogen comprising fluid.

Hence, in a specific embodiment the first electrode comprises a metal or an alloy of one or more of Ni and Fe, and the second electrode comprises nickel metal or an alloy of nickel. The use of a metal or alloy does not exclude the presence of further layers or items, such as the herein described catalyst. A metal may be doped, e.g. Ni may be doped with Mo. The phrase "an alloy of one or more of Ni and Fe" indicates in an embodiment Ni—Fe alloys, but may also in other embodiments refer to alloys substantially comprising Ni or substantially comprising Fe. The phrase "the first electrode comprises a metal or an alloy of one or more of Ni and Fe" indicates that in specific embodiments the first electrode may e.g. comprise Ni metal or Fe metal or a Ni alloy or an Fe alloy, such as a Ni—Fe alloy. The term "alloy" especially refers to a mixture or metallic solid solution composed of two or more elements.

The difference between being permeable and being impermeable may in an embodiment refer to a ratio of the $H^+$ transport through the membrane to the transport of the species to which the electrode is impermeable of at least $1 \cdot 10^5$, such as at least $1 \cdot 10^5$. Especially, the second electrode is non-permeable for oxygen ($O_2$), dinitrogen, ammonia and water. Introduction of the other gasses or liquids in the electrolyte via the second electrode will disturb the process and may lead to other reactions that may be thermodynamically more favourable than the generation of ammonia. For instance, $O_2$ dissolved in the electrolyte through a permeable second electrode may react at the negative electrode as follows: $O_2 + 4H^+ + e^- \Rightarrow 2H_2O$. Also water in the electrolyte will be electrolysed to form $H_2$ and $O_2$ at sufficiently high potential. Especially, the second electrode has a permeability at 25° C. for oxygen gas of less than 0.001 Barrer, for water of less than 0.001 Barrer and for dinitrogen less than 0.001 Barrer, with 1 Barrer=$10^{-10}$ cm$^3$ (STP)cm/(cm$^2$ s cm Hg)=$3.34 \times 10^{-16}$ mol m/(m$^2$ s Pa).

For metallic, closed, membranes hydrogen atoms (protons plus electrons) can move through interstitial atomic positions within the membrane, while molecular oxygen, nitrogen, ammonia and water can not. This leads in general to a very high or almost perfect selectivity for hydrogen gas compared to the other gasses. Here protons and electrons are inserted electrochemically and applied potentials determine their transport. For $H_2$ gas permeation the $H_2$ gas is dissociated and subsequently the individual protons plus (partly) delocalised electrons diffuse through the membrane and reassemble into $H_2$ at the other side of the membrane. Then the hydrogen pressure gradients are the driving force. The solubility of hydrogen atoms (protons plus electrons) are either determined by the applied potentials (electrochemical transport) or by the applied pressures (gas permeation). The electrochemical proton and electron transport can therefore not be compared directly to gas transport. Nevertheless one can compare the amount of hydrogen (protons plus electrons) relative to oxygen, nitrogen, water and ammonia molecules that pass the membrane. For information on permeability, it is amongst others referred to N. W. Ockwig et al. Chemical Reviews 107 (2007) p. 4078-4110; T. M. Nenoff et al. MRS Bulletin vol. 31 (2006) p 735-744, and Stern et al., J. Polymer Science Part A-2, vol. 6, p. 1933-1934. Gas, respectively electrochemical permeability may be determined with methods known in the art.

The first and second electrode may each independently be selected from a self-supporting layer (like a self-supporting foil) or a layer on a support. A suitable support may e.g. be porous Ni foil, a porous ceramic stable in alkaline environment like NiO, $NiTiO_3$, a porous polymer film or polymer electrolyte film when positioned between the two electrodes. Especially, the layer thickness is at least 1 µm, even more at least 5 µm, even more especially at least 10 µm, such as especially at least 20 µm. Further, the layer thickness may be up to e.g. 250 µm, such as up to 150 µm, like 100 µm, such as especially up to 50 µm. Hence, for instance, the layer thickness may be in the range of 2-250 µm, like in the range of 20-50 µm.

Materials of interest have been discussed above. Especially, the electrode material may be based on Ni and/or Fe. Hence, in a specific embodiment, the first electrode comprises one or more of a nickel metal foil and an iron metal foil, and the second electrode comprises a nickel metal foil with $Ni(OH)_2$ and $NiO(OH)$ on the surface.

The electrolyte between the electrodes is an electrolyte that is able to allow transport of protons generated at the second electrode towards the first electrode. This electrolyte may be water based, but is especially anhydrous, in order to prevent or reduce formation of protons and electrons at the first electrode into $H_2$, which may compete with $NH_3$ formation. Especially, the electrolyte comprises an anhydrous proton transporting ionic liquid. Such proton transporting ionic liquid may be used as liquid per se, or may be (further) partially immobilized in a porous polymer film, resulting in a polymer electrolyte. Especially, the (anhydrous) proton transporting ionic liquid which is stable against the applied potential. The electrolyte especially only transports protons, but no electrons. Electrons are transported via the external circuit to the electrodes.

As an electrolyte we can use a very thin layer of ionic liquid. It can be very thin in our approach since the positive and negative solid electrodes provide structural strength and the separation of liquids and gasses by their closed nature. This is a significant difference with e.g. Nafion based electrolytes connected to gas diffusion open electrodes normally used in hydrogen electrolysis. These suffer from hydrogen permeation when the assembly becomes too thin. In our case there will be no $H_2O$, $N_2$, $O_2$ or $NH_3$ permeation possible through the solid Ni or Fe based membranes, allowing for just a thin ionic liquid electrolyte. The electrolyte layer between the electrodes may for instance have thickness in the range of 1-300 µm, such as 4-40 µm.

Clearly the electrochemical stability window and hydrogen transport and acceptance properties need to be excellent. The non-aqueous electrolytes based on ionic liquids offer considerable promise for the proposed cell design which has closed Ni membranes with no gas access to the electrolyte. Also the recently reported (1-ethyl-3-methylimidazolium ethyl sulfate (EMIES)) appears promising, reaching high ionic conductivity. The EMIES could also be incorporated in a polymer membrane made of sulfonated poly(ether ether ketone) (SPEEK) (see e.g. Mondal et al., J. Mater. Chem., 2011, 21, 4117-4124). Other polymer systems that may be used are e.g. Nafion based.

Especially, an electrolyte with a low density of protons should be applied since this will limit the formation of $H_2$ at the negative electrode. A water based electrolyte seems less appropriate since then the negative electrode should not be closed, and the electrolyte may generate hydrogen at the negative electrode. This hydrogen should then be collected and utilized separately and the electrolyte refilled (with liquid electrolyte this could likely be continuously refilled through capillaries).

To promote proton formation at the second electrode and/or to promote $N_2$ dissociation and/or to promote N-binding at the first electrode, the first and the second electrode each independently may comprise a catalyst suitable for one or more of these functions. Especially, the first electrode may comprise at the non-electrolyte side an $N_2$ binding catalyst and/or the second electrode may comprise at the non-electrolyte side an $O_2$ evolution catalyst.

Especially, catalysts known from the Haber process for ammonia synthesis can be applied: a K and/or Li and/or Mg and/or Ca, their oxides or sulfides, modified iron catalyst can be coated on the Ni membrane. Hence, for instance, a potassium modified iron catalyst coating for the negative electrode, i.e. the first electrode, may be applied. Alternatively a Ru based catalyst may be applied. At the positive electrode, an oxygen evolution catalyst may be applied. Often such catalyst is based on one or more noble metals like Ir, for instance $IrO_2$, etc. Especially, the oxygen evolution catalyst may comprise one or more Pt, Pd, Ni, Co, Cu, Ag, W, Os, Ru, Rh, Ir, Cr, Fe, Mo, V, Re, Mn, Nb, and Ta. These may be available as one or more of metal, alloy, oxide, hydroxide and sulfide. Note that also two or more of such elements may be applied. In certain embodiments, the second electrode material may also include the function of oxygen evolution catalyst, such as an Fe or Ni electrode. In specific embodiment, the oxygen evolution catalyst may comprise one or more of $Ni(OH)_2$ and $NiO(OH)$, $RuO_2$, $CoPO_4$, $Co_xMn_{3-x}O_4$ (x~0.8-1.25), $LaNiO_3$, $Mn_{1-x}Mo_xO_{2+x}$ (x~0.04-0.2), W doped $MnO_2$, or perovskites like $Ba_{0.5}Sr_{0.5}Co_{0.8}Fe_{0.2}O_{3-d}$ (d~0.1-0.4).

Especially, the dinitrogen binding catalyst may comprise one or more Pt, Pd, Ni, Co, Cu, Ag, W, Os, Ru, Rh, Ir, Cr, Fe, Mo, V, Zr, Hf, Re, Mn, Nb, and Ta. These may be available as one or more of metal, alloy, oxide and sulfide. Note that also two or more of such elements may be applied. Especially, the dinitrogen binding catalyst comprises an Fe-based catalyst, especially promoted with one or more of K, Li, Na, and Mg. Yet in another embodiment, the dintitrogen binding catalyst comprises one or more of Ru, Ni, Ta and Fe.

Therefore, in a specific embodiment the first electrode further comprises a dinitrogen binding Fe-based catalyst, promoted with one or more of K, Li, Na, and Mg, and wherein the second electrode further comprises an oxygen evolution catalyst.

As further indicated above, the first electrode is in fluid contact with the supply of the dinitrogen comprising fluid. This may indicate that the first electrode can receive fluid, such as liquid or gas, from the supply. This supply may be in a single unit also comprising the electrolytic cell. However, the supply may also be remote, with fluid contact by tubes or conduits. This supply is only in fluid contact with first side of the first electrode, especially the side of the first electrode that may comprise the $N_2$ binding catalyst.

As further indicated above, the second electrode is in fluid contact with the supply of the water comprising fluid. This may indicate that the second electrode can receive fluid, such as liquid or gas, from the supply. This supply may be in a single unit also comprising the electrolytic cell. However, the supply may also be remote, with fluid contact by tubes or conduits. This supply is only in fluid contact with first side of the second electrode, especially the side of the second electrode that may comprise the $O_2$ evolution catalyst. The fluids may thus each independently be a liquid or a gas.

The dinitrogen comprising fluid especially comprises air or substantially pure $N_2$, even more especially substantially pure $N_2$, such as 99.9% $N_2$, with low oxygen or water partial pressures. Hence, the dinitrogen comprising fluid comprises at least 75 vol. % $N_2$. Here, it is especially referred to the dinitrogen comprising fluid that is provided at the second side of the first electrode. Due to $NH_3$ production, the composition of the fluid during processing may be different. However, the dinitrogen comprising fluid provided to the first electrode (second side) is especially rich in $N_2$. In the nitrogen gas hydrogen can be present with the goal to suppress further hydrogen formation in stead of $NH_3$ formation. Especially the $N_2$ comprising is at a pressure of at least 1 bar, such as least 10 bar. Hence, especially the process also includes that the dinitrogen comprising fluid at the first electrode is maintained at a pressure of at least 5 bar. Even more especially, during the process the dinitrogen comprising fluid at the first electrode is maintained at a pressure of at least 10 to 20 bar and a temperature between 20 and 85° C., such as between 20-50° C. Higher pressures may also be used, such as up to 100 bar, especially at temperatures above 50° C. These relative mild conditions may nevertheless result in high yields and an efficient process, as the ammonia generated is in the liquid state when the ammonia reaches a partial pressure of 10 Bar at 25° C. This saves energy to liquefy gaseous ammonia and facilitates separation between $N_2(g)$, $H_2(g)$ and $NH_3(l)$, and $NH_3$ storage procedures.

The water comprising fluid may be liquid water or gaseous water, especially liquid water. Even more especially, it may be alkaline water, such as KOH comprising water. Hence, in an embodiment the water comprising fluid comprises KOH comprising water. Especially, the concentration of KOH in the water comprising fluid can be at least 1 mol/liter, as in 10 mol/liter.

As indicated above, the invention also includes the core of the cell, i.e. the electrolytic cell unit comprising a first electrode, a second electrode, and an electrolyte, wherein the electrolyte is configured to allow transport of protons, wherein the first electrode is permeable for hydrogen (protons plus electrons), wherein the first electrode is at first side in contact with the electrolyte, and wherein the first electrode especially comprises one or more of (metallic) Ni and Fe, wherein the second electrode is permeable for hydrogen (protons plus electrons), and wherein the second electrode is at first side also in contact with the electrolyte. The second electrode is impermeable for $O_2$, $H_2O$. An electrolytic cell may comprise a plurality of such units. Such electrolytic cell may comprise a single supply of dinitrogen comprising fluid and a single supply of a water comprising fluid, both serving a plurality electrolytic cell units comprised by a single electrolytic cell.

The electrolytic cell may also be part of a larger system, such as including one or more of a pressure device, like a pump, a combustion device, and a storage device. Hence, in a further aspect, the invention also provides a system comprising the electrolytic cell as defined herein and a pressure device configured to provide the dinitrogen gas to the electrolytic cell at a pressure above ambient pressure. The invention also provides a system comprising the electrolytic cell as defined herein and further comprising a storage facility configured to store ammonia. The invention also provides a system comprising the electrolytic cell as defined herein and further comprising a combustion device, such as a fuel cell, or a combustion turbine, configured to combust ammonia, such as from the electrolytic cell or the storage facility, especially from the storage facility, and configured to generate one or more of thermal energy and electricity. Hence, the process may further comprise one or more of storing and combusting the thus obtained ammonia. Especially, the ammonia can be combusted in a combustion device, such as a fuel cell at a time when electricity and/or heat is demanded.

The process may further include applying a voltage difference of at least 1.16 V, such as at least 1.18 V, even more especially at least 1.32 V, such as at least 1.4 V, even more especially at least 1.6 V. Further, the process may further include applying a voltage difference of not more than 3.6 V, such as not more than 3V, especially not more than 2.2 V. In a specific embodiment, the process may further include applying a voltage difference of 1.16 V up to 2.2V (while feeding the respective fluids to the respective electrodes). A lower voltage may not give sufficient yields. A too high voltage may lead to an energy inefficient process. As indicated above, a negative voltage is applied to the first electrode and a positive voltage is applied to the second electrode. Power supplies or voltage generators know in the art may be applied. The voltage generator is especially configured to generate a current at a suitable voltage. The method may further include generating a current density of at least 0.01 mA/cm$^2$, such as at least 0.1 mA/cm$^2$, especially at least at least 1 mA/cm$^2$, like at least 10 mA/cm$^2$. The area is the area of the electrode, as known in the art. The areas of the first and the second electrode are in general substantially the same, since they are only separated by a thin electrolyte filled space. Further, the method may further include generating a current density of at maximum 3000 mA/cm$^2$, such as at maximum 2500 mA/cm$^2$, especially at maximum at maximum 2000 mA/cm$^2$, like at maximum 1500 mA/cm$^2$, such as especially at maximum 1000 mA/cm$^2$.

The invention may thus also provide an electrolytic cell, especially for the production of ammonia ($NH_3$), the electrolytic cell comprising (i) an electrolytic cell unit comprising a first electrode, a second electrode, and an electrolyte, (ii) a voltage generator, (iii) a first compartment (especially for a dinitrogen ($N_2$) comprising fluid), and (iv) a second compartment (especially for a water comprising fluid), wherein the voltage generator is configured to apply a negative potential to the first electrode and a positive potential to the second electrode, wherein the electrolyte is configured to allow transport of protons, wherein the first electrode is permeable for hydrogen (protons plus electrons), wherein the first electrode is at first side in contact with the electrolyte and at second side is in fluid contact with the first compartment, and wherein the first electrode comprises especially one or more of Ni and Fe, and wherein the second electrode is permeable for hydrogen (protons plus electrons), wherein the second electrode is at first side also in contact with the electrolyte, and at second side in fluid contact with the second compartment.

The supplies are especially functionally coupled to the electrolytic cell or electrolytic cell unit. Likewise, the optional combustion unit and/or storage facility are functionally coupled to the electrolytic cell or electrolytic cell unit.

In the present invention, both electrodes can be (Ni) films that are impermeable for gases such as at least $O_2$ and $H_2O$, and especially for the second electrode also for $N_2$ and/or $H_2$. The electrodes control flow of both electrons and protons. Especially, the entire surface (at one side) thereof is in contact with the electrolyte. Further, advantageously the electrolyte (liquid) can operate at low T, such as below 100° C., even below 85° C., such as below 60° C. Further, liquid $NH_3$ may be directly synthesized which is not possible with prior art solutions.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

Especially, the invention provides the following embodiments, which are only numbered for the sake of reference:
1. An electrolytic cell for the production of ammonia ($NH_3$), the electrolytic cell comprising (i) an electrolytic cell unit comprising a first electrode, a second electrode, and an electrolyte, (ii) a voltage generator, (iii) a supply of a dinitrogen ($N_2$) comprising fluid, and (iv) a supply of a water comprising fluid, wherein the voltage generator is configured to apply a negative potential to the first electrode and a positive potential to the second electrode, wherein the electrolyte is configured to allow transport of protons, wherein the first electrode is permeable for hydrogen (protons plus electrons), wherein the first electrode is at first side in contact with the electrolyte and at second side is in fluid contact with the supply of the dinitrogen comprising fluid, and wherein the first electrode comprises one or more of Ni and Fe, and wherein the second electrode is permeable for hydrogen (protons plus electrons), wherein the second electrode is at first side also in contact with the electrolyte, and at second side in fluid contact with the supply of the water comprising fluid.

2. The electrolytic cell according to embodiment 1, wherein the second electrode comprises one or more of Ni, Fe, Mn, Mo, W, Cu, V, Ti, Ta, Nb, Zr, Hf, Pt and Pd.
3. The electrolytic cell according to any one of the preceding embodiments, wherein the first electrode comprises one or more of a nickel metal foil and an iron metal foil, and wherein the second electrode comprises a nickel metal foil.
4. The electrolytic cell according to any one of the preceding embodiments, wherein the electrolyte comprises an anhydrous proton transporting ionic liquid.
5. The electrolytic cell according to any one of the preceding embodiments, wherein the first electrode is permeable to hydrogen gas and wherein the second electrode is non-permeable for oxygen ($O_2$), dinitrogen and water.
6. The electrolytic cell according to any one of the preceding embodiments, wherein the first electrode further comprises a dinitrogen binding Fe-based catalyst and wherein the second electrode further comprises an oxygen evolution catalyst.
7. The electrolytic cell according to any one of the preceding embodiments, wherein the second electrode has a permeability at 25° C. for oxygen of less than 0.001 Barrer, for water of less than 0.001 Barrer and for dinitrogen less than 0.001 Barrer.
8. A system comprising the electrolytic cell according to any one of the preceding embodiments and a pressure device configured to provide the dinitrogen gas to the electrolytic cell at a pressure above ambient pressure.
9. The system according to embodiment 8, further comprising a storage facility configured to store ammonia.
10. The system according to any one of embodiments 8-9, further comprising a combustion device configured to combust ammonia from the storage facility and configured to generate one or more of electricity and thermal energy.
11. An electrolytic cell unit comprising a first electrode, a second electrode, and an electrolyte, wherein the electrolyte is configured to allow transport of protons, wherein the first electrode is permeable for hydrogen (protons plus electrons), wherein the first electrode is at first side in contact with the electrolyte, and wherein the first electrode comprises one or more of Ni and Fe, wherein the second electrode is permeable for hydrogen (protons plus electrons), and wherein the second electrode is at first side also in contact with the electrolyte.
12. A process for the production of ammonia comprising feeding a dinitrogen comprising fluid to the first electrode and a water and KOH comprising fluid to second electrode of the electrolytic cell unit as defined in embodiment 11 while applying a voltage difference in the range of 1.16 V up to 3.6V (with especially the first electrode as negative electrode and the second electrode as positive electrode.
13. The process according to embodiment 12, wherein the water comprising fluid comprises KOH comprising water.
14. The process according to any one of embodiments 12-13, wherein the dinitrogen comprising fluid at the first electrode is maintained at a pressure of at least 5 bar.
15. The process according to any one of embodiments 12-14, wherein the ammonia at the first electrode is maintained at a partial pressure of at least 10 bar and at a temperature between 20 and 85° C.
16. The process according to any one of embodiments 12-15, wherein the process further comprises one or more of storing and combusting the thus obtained ammonia.
17. The process according to any one of embodiments 12-16, wherein the electrolytic cell according to any one of embodiments 1-7 is applied.
18. The process according to any one of embodiments 12-17, further comprising maintaining an ammonia partial pressure above the vapor pressure of ammonia at the temperature of operation.
19. The process according to any one of embodiments 12-18, further comprising feeding a dinitrogen and hydrogen comprising fluid.
20. The process according to any one of embodiments 12-19, wherein the first electrode is at the first side in contact with the electrolyte and at the second side is in fluid contact with a supply of the dinitrogen comprising fluid, wherein the second electrode is at the first side also in contact with the electrolyte, and at the second side in fluid contact with a supply of the water comprising fluid, and wherein a first fluid pressure at the second side of the first electrode and a second fluid pressure at the second side of the second electrode are substantially equal.

The present invention especially does not include a sequential approach as known from the prior art. Further, in an embodiment Pt is not applied (as first electrode material), as Pt may promote the generation of hydrogen gas instead of $NH_3$ and neutral $H_2$ will not be prevented to escape from the Pt.

The first electrode is especially non-permeable for a gas or liquid, but is permeable to hydrogen (protons plus electrons). At the other side of the first electrode, the protons may in combination with $N_2$ be formed into ammonia. The pressure at the other side of the first electrode (e.g. first compartment) may be such that ammonia is liquid. Hence, especially only liquid ammonia may be retrieved at that side from the cell. Hence, in an embodiment a pressure device (is applied which may be) configured to provide the dinitrogen gas to the electrolytic cell at a pressure above ambient pressure, and/or which is configured to retrieve liquid ammonia from the electrolytic cell. The pressure at this side of the first electrode may be maintained at a level that ammonia stays liquid. The first electrode may be a massive metal or alloy, such as e.g. selected from the group consisting of a Ni—Ti alloy (like $Ni_3Ti$), an Ni—Ti—Ta alloy, Ni—Nb—Ti, Ni—Nb—V, a Cu—Pd alloy, Pd—Ta, etc. As indicated above, the first electrode is especially non-permeable for $N_2$ and $NH_3$ but it is permeable to hydrogen.

Also the second electrode is especially non-permeable for gasses, or at least non-permeable for $O_2$ and $H_2O$. Especially, the electrodes are also non-permeable for one or more of water and ammonia. Hence, the electrodes may be membrane like for hydrogen (protons and electrons), but not for one or more of $O_2$, ammonia and $H_2O$.

The metallic electrodes transport protons from one side of the electrode through this electrode to the other side. At the positive electrode it separates protons and electrons from (alkaline) water and oxygen. At the negative electrode the protons are also transported through the electrode and react on the opposite surface with nitrogen gas and electrons into liquid or gaseous ammonia. In prior art solutions, the protons are only transported through the electrolyte, not as interstitial atoms (protons plus (partly delocalized) electrons) through the electrodes. Further, in prior art solutions the electrodes are not impermeable to oxygen gas, water, etc. Hence, in prior art solutions the closed metallic electrodes that may herein be employed are not present. The herein described electrodes are especially needed to transmit hydrogen as interstitial atoms through the electrode and to prevent crossover of the oxygen we produce at the positive electrode to the negative electrode. Further, prior art solutions may only allow batch processes, wherein the present invention allows a continuous process.

Good electrodes may in embodiments consist of the herein indicated metals, or alloys of two or more thereof. Specifically of interest are one or more of Nb, Ta, Ni3Ti, and Fe.

Especially, the electrolyte is not used as source of nitrogen gas or nitrogen atoms. Nitrogen gas, or another dinitrogen comprising fluid is provided at the other side of the first electrode; not between the first and the second electrode.

Advantageously, the process of the invention may be executed at a temperature below 100° C., such as 85° C. or lower, where the $NH_3$ formed is thermodynamically stable.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 1 will be further elucidated below;

FIGS. 2-4 have been further elucidated above.

Schematic drawings are not necessarily on scale.

DETAILED DESCRIPTION OF THE EMBODIMENTS

Figure 1:
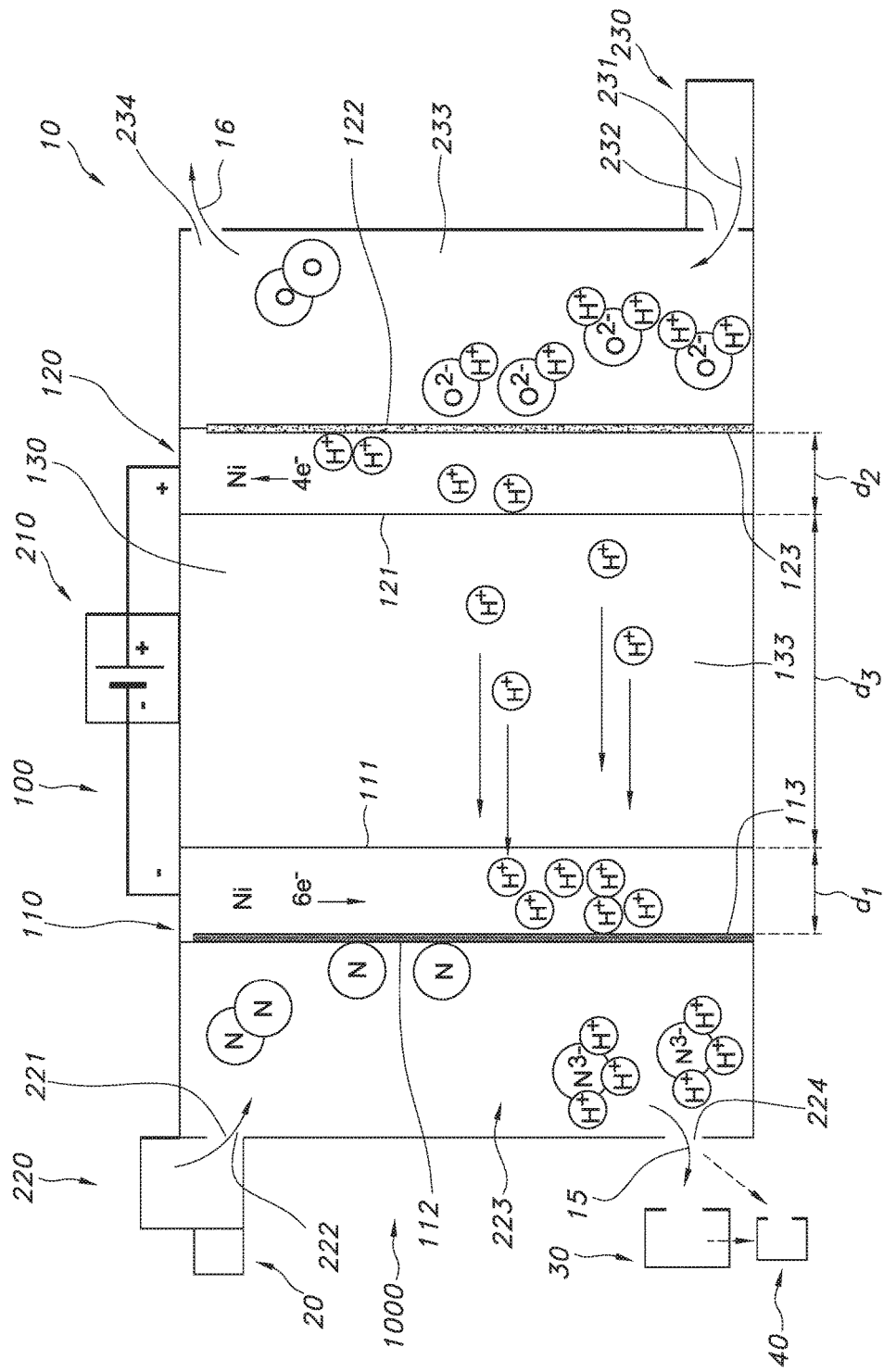
FIG. 1 schematically depicts the electrolytic $NH_3$ synthesis from $H_2O$ and $N_2$. The working model has Ni based electrodes which transmit hydrogen atoms (protons ($H^+$) plus electrons) through the metal. The proton electrolyte layer can be made very thin to minimize resistive losses.
Figure 2:
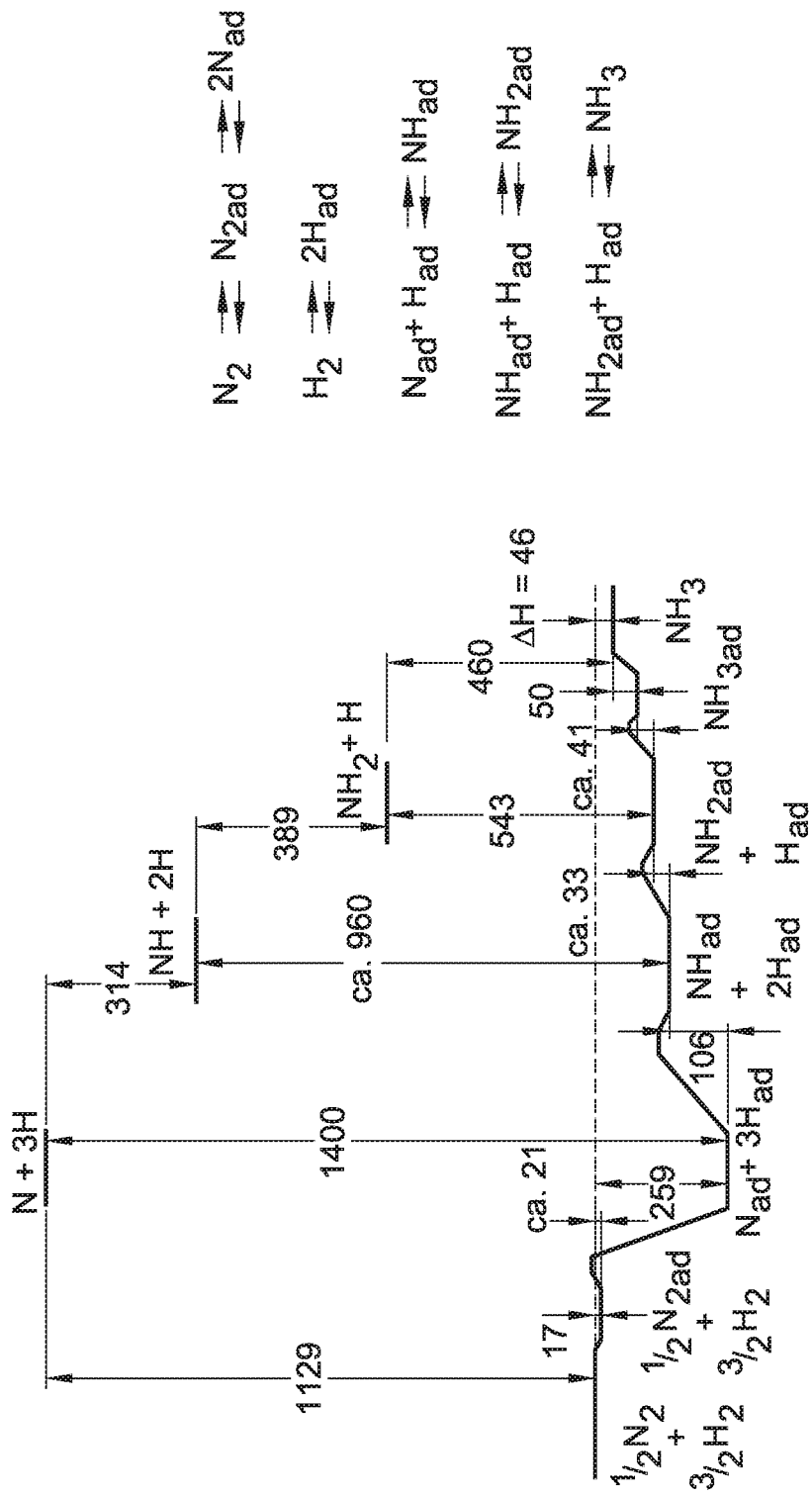
FIG. 2 schematically depicts the mechanism and potential energy diagram of ammonia synthesis on an iron surface from the reference G. Ertl, Ang. Chem. Int. Edition 47 (2008) 3524-3535. Energies are in kJ/mol.
Figure 3B:
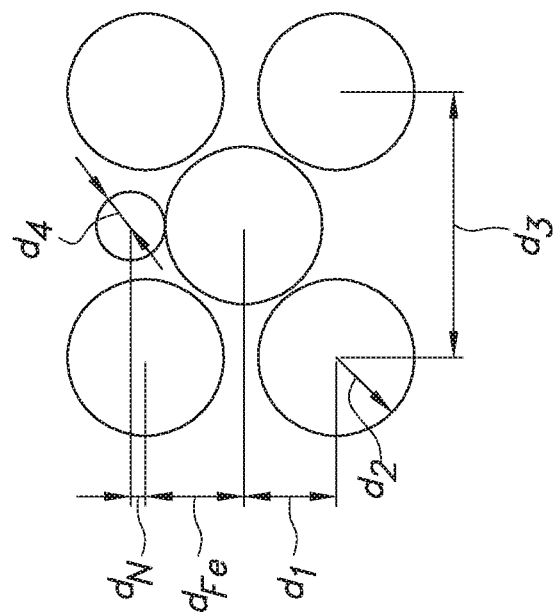
FIGS. 3a-3b schematically depicts the Fe [100] surface where the large circles represent Fe atoms and the smaller ones chemisorbed N atoms (copied from G. Ertl, Ang. Chem. Int. Edition 47 (2008) 3524-3535). According to Ertl, of which these figures are gratefully copied, $d_N$ is 0.27 Å, $d_{Fe}$ is 1.54 Å, $d_1$ is 1.43 Å, $d_2$ is 1.24 Å, $d_3$ is 4.05 Å, and $d_4$ is 0.59 Å
Figure 3A:
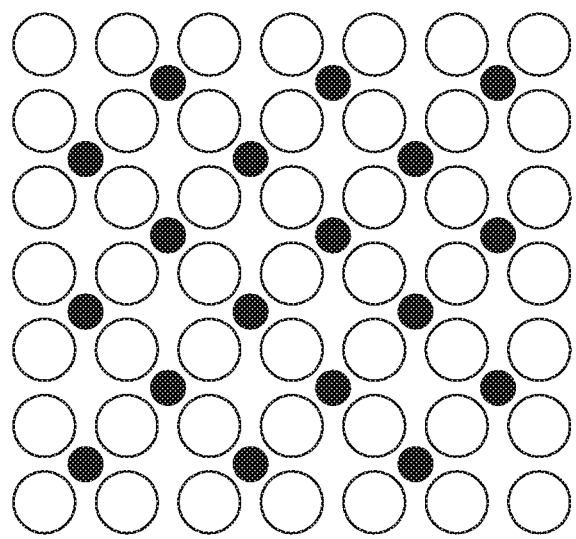
Figure 4:
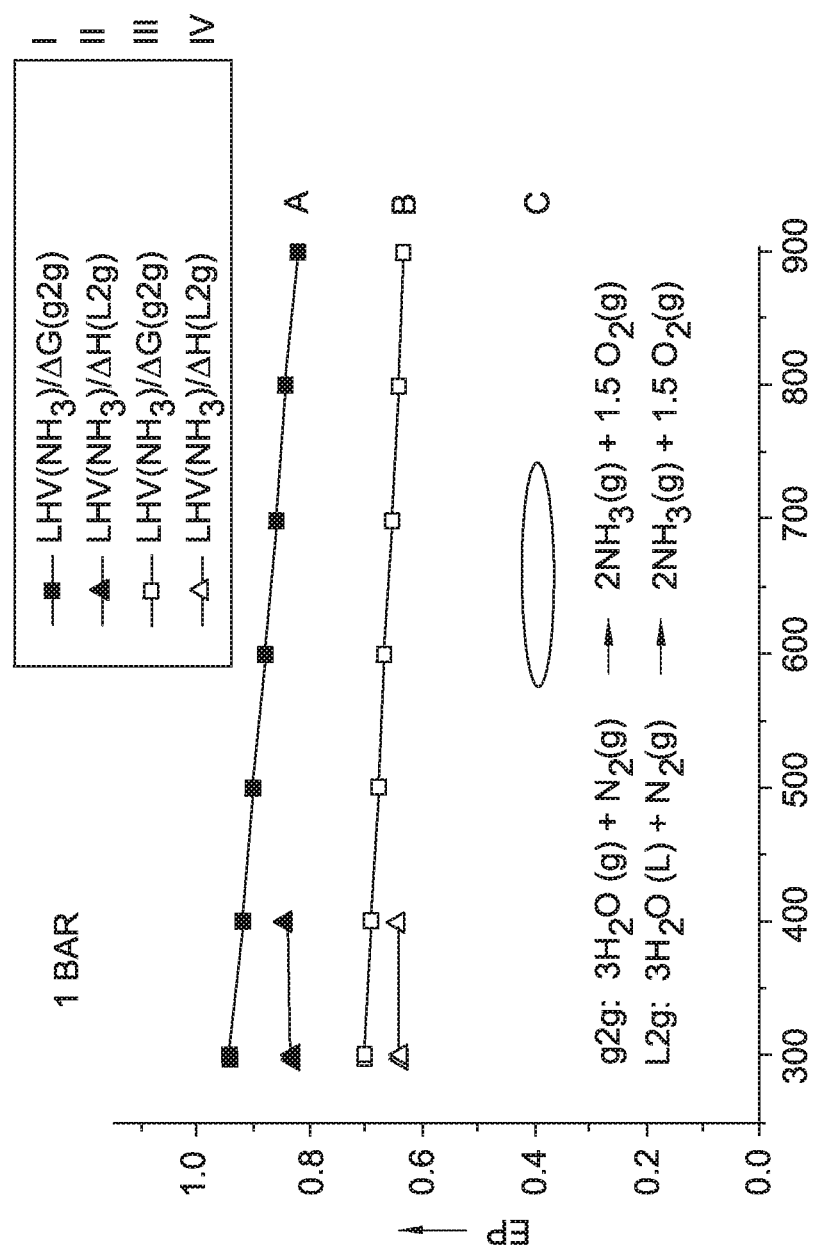
FIG. 4 shows efficiency factors calculated as the lower heating value (LHV) of ammonia fuel divided by the electrical input energy. The latter equals the Gibbs free energy change $\Delta G(g2g)$ for gaseous $H_2O$ to gaseous $NH_3$ synthesis and the change in enthalpy $\Delta H(L2g)$ for liquid $H_2O$ to gaseous $NH_3$ synthesis (this has to do with heat being produced or being consumed from the environment during the reaction). The middle curves (ref. B; curves III&IV) include an overpotential of 0.4 V during the electrolysis compared to the equilibrium potential (g2g) respectively the thermo neutral potential (L2g). The state of the art hydrogen production by electrolysis followed by the Haber process has about 40% efficiency compared to the HHV of ammonia (grey area, compared with the LHV as the others this 40% becomes 33%)(ref. C). Reference A indicates the thermodynamic limit (curves I and II); reference B indicates the limit with realistic loss factors. EP on the y-axis indicates an efficiency factor.

FIG. 1 schematically depicts an electrolytic cell 10 for the production of ammonia ($NH_3$). The electrolytic cell 10 comprises an electrolytic cell unit 100 comprising a first electrode 110, a second electrode 120, and an electrolyte 133, a voltage generator 210, a supply 220 of a dinitrogen comprising fluid 221, and a supply 230 of a water comprising fluid 231 in which KOH is dissolved. The voltage generator 210 is configured to apply a negative potential to the first electrode 110 and a positive potential to the second electrode 120. Further, the electrolyte 133 is configured to allow transport of protons. The first electrode 110 is permeable for hydrogen (protons plus electrons). The first electrode 110 is at first side 111 in contact with the electrolyte 133 and at second side 112 in fluid contact with the supply 220 of the dinitrogen comprising fluid 221. For instance, the first electrode 110 comprises one or more of Ni and Fe. The second electrode 120 is also permeable for hydrogen (protons plus electrons). Further, the second electrode 120 is at first side 121 also in contact with the electrolyte 133, and at second side 122 in fluid contact with the supply 230 of the water comprising fluid 231. Ammonia, especially an ammonia comprising fluid that is generated is indicated with reference 15. Reference 16 indicates an outflow of the oxygen comprising fluid 16 (via outlet or exhaust 234). There can be a constant flow of fluid 231 and also of fluid 221 to supply the cell with new water and nitrogen to form ammonia and oxygen. In principle, the amount of water and/or $N_2$ can be chosen such to be essentially entirely consumed in the reaction. Reference 113 indicates a dinitrogen binding catalyst, especially at the non-electrolyte side of the first electrode 111, such as an Fe catalyst (with optionally a promotor like K (potassium)), or a Ru, Ni, Nb, based catalyst.

At both respective sides of the electrodes, compartments 223 (first compartment) and 233 (second compartment), respectively may be present. The respective supplies 220, 230 may introduce in these respective compartments the respective fluids 221,231, via inlets 222,232, respectively. Hence, the cell may further include an inlet 222 for the dinitrogen comprising fluid 221, an inlet 232 for the water comprising fluid 231, an exhaust 224 for an ammonia comprising fluid 15, and an exhaust 234 for an oxygen comprising fluid 16.

The electrolyte 133 is contained in a compartment 130 between (a first side 111 of the) first electrode 110 and (a first side 121 of the) second electrode 210. The thickness of the electrolyte layer is indicated with reference d3. The thicknesses of the first and the second electrode are indicated with d1 and d2 respectively, and may especially be in the range of about 0.5-250 μm.

By way of example, this schematic drawing shows the electrolytic cell 10 also in a possible embodiment of a system 1000. Such system 1000 comprises the electrolytic cell as defined herein, and e.g. a pressure device 20, such as a pump, configured to provide the dinitrogen gas to the electrolytic cell 10 at a pressure above ambient pressure. Further, such system 1000 may comprise a storage facility 30 configured to store ammonia. Also, such system may optionally comprise a fuel cell or combustion device 40 configured to combust ammonia from the electrolytic cell 10 or the storage facility 30 and configured to generate one or more of electricity and thermal energy.

The invention claimed is:
1. An electrolytic cell for the production of ammonia ($NH_3$) from $N_2$ and $H_2O$, the electrolytic cell comprising (i) an electrolytic cell unit comprising a first electrode, a second electrode, and an electrolyte, (ii) a voltage generator, (iii) a supply of a dinitrogen ($N_2$) comprising fluid, and (iv) a supply of a water comprising fluid, wherein the voltage generator is configured to apply a negative potential to the first electrode and a positive potential to the second electrode, wherein the electrolyte is configured to allow transport of protons, wherein the first electrode is permeable for protons and non-permeable for $O_2$ and $H_2O$, wherein the first electrode is at first side in contact with the electrolyte and at second side is in fluid contact with the supply of the dinitrogen comprising fluid, and wherein the second electrode is permeable for protons, and non-permeable for $O_2$, or $H_2O$, wherein the second electrode is at first side also in contact with the electrolyte, and at second side in fluid contact with the supply of the water comprising fluid, and wherein the electrolyte is contained in a compartment between the first side of the first electrode and the first side of the second electrode.

2. The electrolytic cell of claim 1, wherein the first electrode comprises a metal or an alloy of one or more of Ni and Fe, or Ni, Fe, Mn, Mo, W, Cu, V, Ti, Ta, Nb, Zr, Hf, and wherein the second electrode comprises nickel metal or an alloy of nickel.

3. The electrolytic cell of claim 2, wherein the second electrode comprises one or more of Ni, Fe, Mn, Mo, Ru, W, Cu, V, Ti, Ta, Nb, Zr, Hf, Pt and Pd.

4. The electrolytic cell of claim 1, wherein the first electrode comprises one or more of a nickel metal foil and an iron metal foil, and wherein the second electrode comprises a nickel metal foil.

5. The electrolytic cell of claim 1, wherein the electrolyte comprises an anhydrous proton transporting ionic liquid.

6. The electrolytic cell of claim 1, wherein the first electrode is permeable to hydrogen gas and wherein the second electrode is non-permeable for oxygen ($O_2$), dinitrogen and water.

7. The electrolytic cell of claim 1, wherein the first electrode further comprises a dinitrogen binding catalyst and wherein the second electrode further comprises an oxygen evolution catalyst.

8. The electrolytic cell of claim 1, wherein the second electrode has a permeability at 25° C. for oxygen of less than 0.001 Barrer, for water of less than 0.001 Barrer and for dinitrogen less than 0.001 Barrer.

9. The system of claim 8, further comprising a storage facility configured to store ammonia and/or a combustion configured to combust ammonia from the storage facility and to generate one or more of electricity and thermal energy.

10. A system comprising the electrolytic cell of claim 1 and a pressure device configured to provide the dinitrogen gas to the electrolytic cell at a pressure above ambient pressure, and configured to retrieve liquid ammonia from the electrolytic cell.

11. An electrolytic cell unit comprising a first electrode, a second electrode, and an electrolyte, wherein the electrolyte is configured to allow transport of protons, wherein the first electrode is permeable for hydrogen and non-permeable for $O_2$ and $H_2O$, wherein the first electrode is at first side in contact with the electrolyte, wherein the second electrode is permeable for protons, and wherein the second electrode is at first side also in contact with the electrolyte.

12. The electrolytic cell unit of claim 11, wherein the first electrode comprises one or more of Ni and Fe and wherein the second electrode comprises nickel metal or an alloy of nickel.

13. The electrolytic cell unit of claim 12, wherein the first electrode comprises a metal or an alloy of one or more of Ni and Fe.

14. A process for the production of ammonia comprising feeding a dinitrogen comprising fluid to the first electrode of the electrolytic cell unit of claim 11 and a water and KOH comprising fluid to the second electrode the electrolytic cell unit while applying a voltage difference in the range of 1.16 V up to 3.6V.

15. The process of claim 14, wherein the dinitrogen comprising fluid at the first electrode is maintained at a pressure of at least 5 bar, and wherein the dinitrogen comprising fluid comprises at least 75 vol. % $N_2$.

16. The process of claim 14, wherein the ammonia at the first electrode is maintained at a partial pressure of at least 10 bar and at a temperature between 20 and 85° C.

17. The process of claim 14, wherein the process further comprises one or more of storing and combusting the thus obtained ammonia.

18. The process of claim 14, further comprising maintaining an ammonia partial pressure above the vapor pressure of ammonia at the temperature of operation.

19. The process of claim 14, further comprising feeding a dinitrogen and hydrogen comprising fluid.

20. The process of claim 14, wherein the first electrode is at a first side in contact with the electrolyte and at the second side is in fluid contact with a supply of the dinitrogen comprising fluid, wherein the second electrode is at the first side also in contact with the electrolyte, and at the second side in fluid contact with a supply of the water comprising fluid, and wherein a first fluid pressure at the second side of the first electrode and a second fluid pressure at the second side of the second electrode are substantially equal.

21. The process of claim 14, further comprising retrieving liquid ammonia from the electrolytic cell unit from a second side of the first electrode.

* * * * *